(No Model.)
R. CAMPBELL.
DIFFERENTIAL LEVER.
No. 503,561. Patented Aug. 15, 1893.
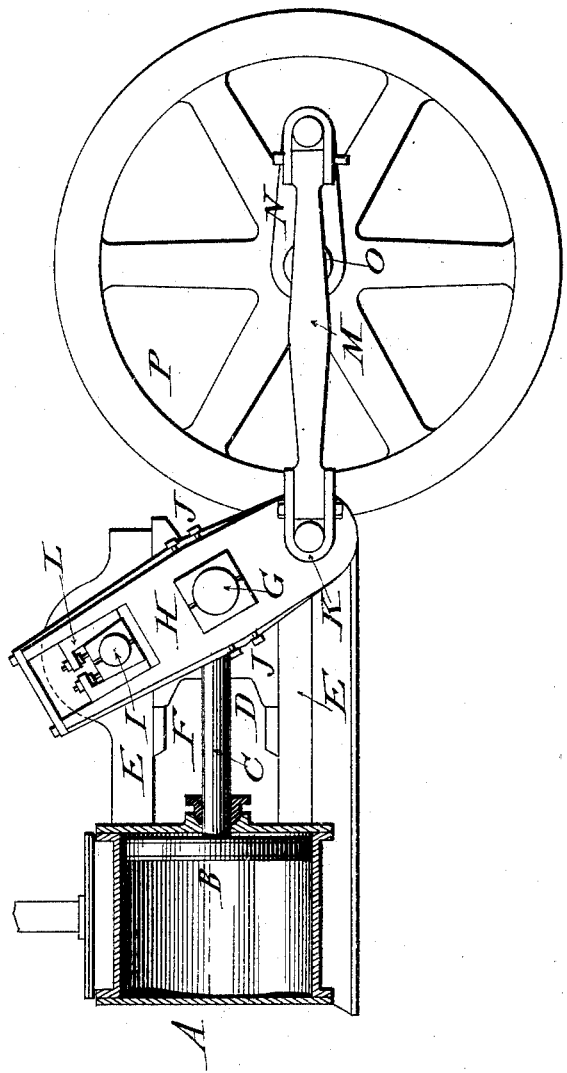
Witnesses:
F. W. Campbell
A. B. Campbell
Inventor.
Robert Campbell

UNITED STATES PATENT OFFICE.

ROBERT CAMPBELL, OF ALLEGHENY, PENNSYLVANIA.

DIFFERENTIAL LEVER.

SPECIFICATION forming part of Letters Patent No. 503,561, dated August 15, 1893.

Application filed December 12, 1892. Serial No. 454,932. (No model.)

*To all whom it may concern:*

Be it known that I, ROBERT CAMPBELL, a citizen of the United States, residing in Allegheny, in the county of Allegheny and State of Pennsylvania, have invented a new and useful Improvement in Mechanism, of which the following is a specification.

My invention relates to a forked or slotted differential lever, forming part of the motor connections of an engine.

The object of my invention is to secure economy of space without loss of power. This object I attain by the mechanism illustrated in the accompanying drawing which forms a part of this specification.

The figure is a side view of an engine provided with a forked or slotted differential lever as a part of its motor connections.

A, B, C, D, E and F are the cylinder, piston, piston rod, cross-head, cross-head frame, and cross-head guides, respectively.

G is the cross-head pin.

H is a forked or slotted differential lever.

I is a pin, rigidly affixed to the cross-head frame E.

J, J, are set screws for the bearings of the lever H, as connected with the cross-head pin G.

K is a pin in lever H connecting the lever with the pitmen or connecting rod M.

L is a take-up-box or bearing on which the lever H is fulcrumed.

M, N, O and P are the connecting-rod, crank, crank shaft and fly-wheel, respectively.

When the piston B is operated by any proper motor force under the control of valves, &c., proper to engines, the current piston force giving a reciprocatory movement to the cross-head D will cause the lever H to oscillate by the power of the cross-head pin G on which the lever is pivoted. The parallel motion of the cross-head will give the lever a sliding motion on its fulcrum or bearing L which is fitted to oscillate with the lever upon the pin or fixed fulcrum I. The effective power of the piston force is transmitted through the lever and connecting-rod M to the crank N and changed to rotary motion.

Having plainly described my invention, what I claim, and desire to secure by Letters Patent, is—

In motor connections, the combination of a slotted differential lever, a cross-head upon which said lever is pivoted, a fixed fulcrum, and a fulcrum-bearing on said fixed fulcrum, substantially as set forth.

ROBERT CAMPBELL.

Witnesses:
F. W. CAMPBELL,
R. B. CAMPBELL.